Nov. 23, 1965  J. B. HYMOWITZ  3,219,427

BUBBLERS

Filed July 2, 1962

INVENTOR.
JEROME B. HYMOWITZ
BY
Clarence R. Patty, Jr.
ATTORNEY

3,219,427
BUBBLERS
Jerome B. Hymowitz, Corning, N.Y., assignor to Corning Glass Works, Corning, N.Y., a corporation of New York
Filed July 2, 1962, Ser. No. 206,693
9 Claims. (Cl. 65—134)

This invention relates to an improved method of and apparatus for bubbling gases through baths of molten material, and more particularly to improved bubbler construction for facilitating the formation of large-sized bubbles in molten material while inhibiting the ingress of the molten material into the bubbler.

In conventional continuous glass melting processes a temperature gradient exists between the surface of the glass, where heat is applied, and the glass layer along the bottom of the tank. In order to obtain optimum melting and fining conditions it is desirable to maintain the temperature between the surface of the glass and the bottom layers thereof as nearly uniform as possible, by setting up and controlling convection currents in the furnace to continually mix the surface and bottom layers of glass and reduce the temperature gradient. The use of gas bubblers for increasing these convection currents not only increases the overall efficiency of the melter, but also results in the production of glass having uniform homogeneous consistency.

It has been found that the rate of vertical movement of molten glass in a tank, provided with bubblers, will vary proportionately with size of the bubbles formed. In order to achieve maximum stirring by convection currents produced by bubblers, it has been deemed advisable to introduce the largest size bubbles possible.

In continuous bubbling systems it is possible to reguate the flow of the gas to increase or decrease the number of bubbles formed per unit of time, however, the size of the bubbles formed is substantially constant for a given viscosity of glass and given quantity of gas flow through the bubbler tubes. In an endeavor to form larger size bubbles, a pulsing system was devised wherein a quantity of gas was pulsed through the bubbler tube at predetermined time intervals. The pulse system, however, has not been completely satisfactory, since it requires a second or balancing pressure in order to prohibit the ingress of the molten bath into the bubbler tubes between the pulses.

My invention incorporates the utilization of novel configurations for the gas outlet or discharge orifices or bubbler tubes which not only permit the formation of large-sized bubbles in continuous bubbling systems, but also facilitate the formation of such large-sized bubbles in pulsed systems without requiring a second balancing pressure to prohibit the ingress of molten fluid into the bubbler tube.

It thus has been an object of my invention to provide an improved method of introducing gases into molten baths to form large-sized bubbles.

A further object of my invention has been to produce an improved bubbler tip or discharge orifice for facilitating the formation of large-size bubbles in a molten bath while inhibiting the ingress or seepage of the molten bath into the bubbler tube.

An additional object of my invention has been to provide improved configurations for the orifice of bubbler tubes which permit the continuous or periodic pulsed introduction of large-size bubbles into a molten bath while inhibiting the ingress or seepage of such bath into the bubbler tube.

These and other objects of my invention will be apparent to those skilled in the art from the following disclosure and accompanying drawings in which.

Figure 1:
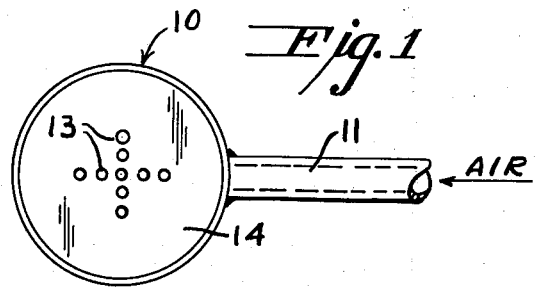
FIGURE 1 is an enlarged plan view of a bubbler embodying my invention.
Figure 2:
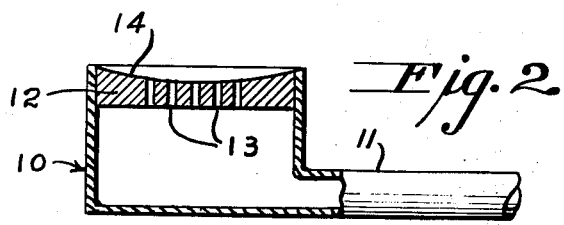
FIGURE 2 is a side elevational view partially in section of, and on the same scale as, the bubbler shown in FIGURE 1.

Referring now to FIGURES 1 and 2, a bubbler tube 10 is shown having an inlet conduit 11 and a closed upper or outlet end portion 12 provided with perforations 13. The perforations 13 are shown as a plurality of small circular holes arranged in cruciform configuration and positioned in substantial axial alignment with the longitudinal axis of the bubbler tube. As shown, the upper surface 14 of the end portion 12 is concave and extends radially outwardly past the bounding end portions of the perforations 13, thus forming a large overall bubble attachment surface area as compared to the area within the bounds of the extremities of the cruciform configuration.

Although the invention is represented in FIGURES 1 and 2 in connection with an over-the-side type of bubbler having an inlet conduit communicating with the sidewall thereof, it will be readily apparent that the invention is equally applicable to all types of bubbler tubes, including bottom-mounted tubes, represented in FIGURES 3–10.

Figure 3:
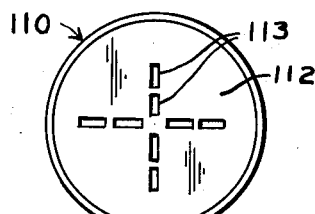
FIGURE 3 is an enlarged plan view of a bubbler tip embodying another form of my invention.
Figure 4:
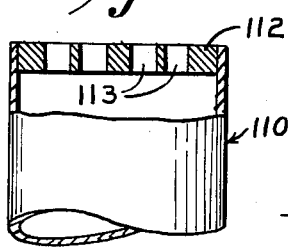
FIGURE 4 is a side elevational view, partially in section, of the bubbler tip shown in FIGURE 3.

The surface 14 of the embodiment shown in FIGURES 1 and 2 provides a large surface contact area between the bubbler tip and initially formed bubbles, not only by extending outwardly beyond the bounds of the perforated configuration, but also by being concave so as to complement a bottom surface portion of the bubbles as formed. The large surface area provides for greater bubble adhesion and facilitates the formation of larger size bubbles before they break loose from the bubbler tip. Planar-surfaced bubbler tips such as illustrated in FIGURES 3 and 4, having surface attachment areas substantially comparable to that bounded by the extremities of the perforated configurations, also produce exceptionally good operating results within the context of my invention and facilitate the formation of large-sized bubbles while inhibiting the ingress of molten material into the bubbler tube.

Although virtually any design or configuration of openings or perforations having a degree of symmetry may be utilized, the critical factors which must be present in all of the configurations are: (1) the openings or perforations must be positioned close enough together so that as the gas emerges simultaneously therefrom it coalesces into a large bubble adjacent the bubbler tip; and, (2) the combined or total perimeter of all of the openings or perforations must be relatively large in proportion to, or as compared with, the perimeter of a single opening having the same area as the combined or total area of the perforations, so that the surface tension of the molten fluid in the bath being bubbled will inhibit the ingress of the molten fluid into the bubbling tube. In other words, the total or combined area of all of the openings or perforations must be relatively small, as compared to the area of a single opening having a perimeter equal to the total perimeter of the perforations.

The specific dimensions of the various opening or perforations and distances therebetween will vary with the temperature of the bath and accordingly the viscosity of the fluid bath being bubbled. As the viscosity of the fluid increases, the perforations may also be increased slightly without fear of seepage of the molten fluid into the bubbler tube.

By way of example, and by no means limiting in nature, a bubbler tube having a configuration shown in FIGURES 1 and 2 was utilized to bubble air into a fluid representing a molten glass having a viscosity of about 300 poises at approximately 1300° C. The holes forming the cruciform configuration had a diameter of approximately .04 inch and were spaced about 1/32 of an inch apart so as to form a cross of about 1/2 inch wide in the upper surface of the bubbler tube having an outside diameter of approximately 1 1/2 inches. This particular configuration produced bubbles with a diameter of approximately 3 inches to 5 inches, depending upon the pressure applied to the orifice. In the above example, the total perimeter of all of the perforations was approximately 200 times the radius of a hole having an area equivalent to the total area of all of the perforations times the perimeter of such large hole.

Referring now to FIGURES 3 and 4, a bottom mountable type of bubbler tube 110, supplied with bubbling gas at the lower end in the conventional manner, is shown having a closed upper end portion 112 provided with perforations 113 in the form of slots arranged in a cruciform or X-shape. The upper surface of the closed end portion 112 is shown as a planar bubble attachment surface having an area substantially equal to that bounded by the outer extremities of the cruciform configuration.

Figure 5:
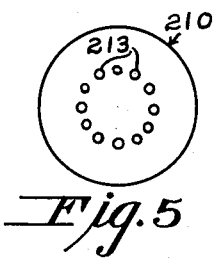
FIGURES 5–10 are plan views of various bubbler tips having orifice configurations embodying my invention.
Figure 6:
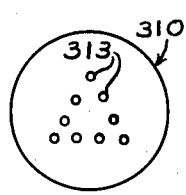
Figure 7:
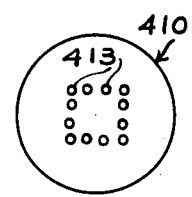
Figure 8:
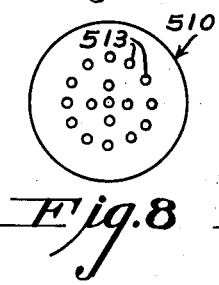
Figure 9:
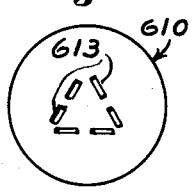
Figure 10:
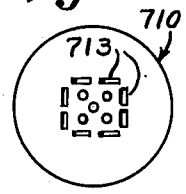

FIGURES 5–10 are representative of various configurations of perforations which may be utilized in bubbler tips embodying my invention. FIGURES 5, 6 and 7 illustrate bubbler tips 210, 310, and 410, respectively, having open portions or perforations 213, 313, and 413, respectively, in the form of circular holes arranged in a circular, triangular, and square configuration, respectively. FIGURE 8 illustrates a bubbler tip 510 having perforations 513 in the form of circular holes arranged in a circular configuration with a geometrical pattern formed therewithin. FIGURE 9 illustrates a bubbler tip 610 having open portions or perforations 613 formed as elongated slots arranged in a triangular configuration. FIGURE 10 illustrates a bubbler tip having perforations or openings 713 in the form of both circular holes and elongated slots, wherein the elongated slots form a square configuration with the perforated holes forming a geometric pattern therewithin. It thus can be seen that virtually any closed-sided figure or geometric pattern or combination thereof formed from open portions or perforations of circular holes and/or elongated slots, or the like, may be utilized within the scope of my invention. In addition, random perforations may be incorporated within a closed-sided configuration or in connection with a geometric pattern.

Although I have disclosed various embodiments of my invention, it will be apparent to those skilled in the art that various changes and modifications may be made thereto without departing from the spirit and scope of the invention as defined in the following claims.

I claim:

1. Improved bubbling apparatus for forming large-sized bubbles in a fluid bath while inhibiting the ingress of such fluid bath into the bubbling apparatus comprising, a hollow bubbling member, passage means within said member for passing bubbling gas therethrough, a closed bubbling outlet portion at one end of said member submerged within the fluid bath, a plurality of closely spaced opening means formed through said closed bubbling outlet portion for cooperatively forming a unitary large-size bubble at periodic intervals responsive to the passage of bubbling gas through said member, and the cross-sectional area of each of said opening means being small to cooperate with the surface tension of the fluid bath to inhibit the ingress of said fluid bath into said bubbling member through said opening means when no bubbling gas is passing through said member.

2. Improved apparatus for forming large-sized bubbles in a fluid bath while inhibiting the ingress of the fluid bath into the bubbling apparatus comprising, a hollow bubbling tube submerged in said fluid bath, inlet means adjacent one end of said tube for introducing gas under pressure into said tube, a closed bubbling tip forming an end portion of said bubbling tube, a bubble attachment surface area forming the outer surface of said bubbling tip, a plurality of openings extending through said bubbling tip and communicating between the interior of said bubbling tube and said attachment surface area, said openings being surrounded at their outer ends by said attachment surface area, said closed bubbling tip including means to space said openings in cooperable proximity with each other so that gas emitted simultaneously therefrom will coalesce and form a single large-sized bubble at said attachment surface area, and the cross-sectional area of each of said openings being small to cooperate with the surface tension of the fluid bath to inhibit the ingress of said fluid bath into said bubbling tube through said openings when no gas is introduced into said tube.

3. Improved bubbling apparatus as defined in claim 2 wherein said plurality of openings are in the form of circular holes arranged in a cruciform configuration centered in substantial alignment with the longitudinal axis of said bubbling tube.

4. Improved bubbling apparatus as defined in claim 2 wherein said surface attachment area is concave and is substantially greater than the area bounded by the extremities of said geometric configuration.

5. Improved bubbling apparatus as defined in claim 2 wherein said plurality of openings are in the form of elongated slots arranged in a cruciform configuration substantially centered in alignment with the longitudinal axis of said bubbling tube.

6. Improved bubbling apparatus as defined in claim 2 wherein said plurality of openings are closely spaced circular holes arranged in the form of a closed-sided figure substantially centered with respect to the longitudinal axis of the bubbler tube.

7. Improved bubbling apparatus as defined in claim 2 wherein said plurality of said openings are closely spaced elongated slots arranged in the form of a closed-sided figure substantially centered with respect to the longitudinal axis of said bubbler tube.

8. Improved bubbling apparatus as defined in claim 2 wherein said plurality of openings are in the form of closely spaced circular holes and elongated slots communicating with said attachment surface area.

9. An improved method of pulsing bubbles into a molten bath with a single pressure while inhibiting the ingress of said bath into the bubbling system including, periodically injecting a plurality of small closely-spaced streams of gas into said molten bath, coalescing such streams of gas into a single unitary large-sized bubble adjacent a common attachment surface surrounding the points of injection, releasing said large-size bubble while below the surface of said bath, and restricting the flow of said bath into the bubbling system intermediate the periodic injections independently of gas pressure in the bubbling system by forming a capillary seal at the points where the streams of gas are injected into said bath.

(References on following page)

References Cited by the Examiner

UNITED STATES PATENTS

| | | | |
|---|---|---|---|
| 430,095 | 6/1890 | Thain | 46—6 |
| 555,411 | 2/1896 | Thain | 46—6 |
| 1,995,108 | 3/1935 | Schoepe | 46—6 |
| 2,521,397 | 9/1950 | Muller | 261—124 |
| 2,841,372 | 7/1958 | Phillips | 261—41 |
| 2,890,548 | 6/1959 | Wright | 65—178 X |

FOREIGN PATENTS 357,599   9/1931   Great Britain.

HARRY B. THORNTON, *Primary Examiner.*

RONALD R. WEAVER, *Examiner.*